June 13, 1961  D. G. MARLOW  2,988,728
PIEZOELECTRIC HYDROPHONE
Filed July 6, 1953  2 Sheets-Sheet 1
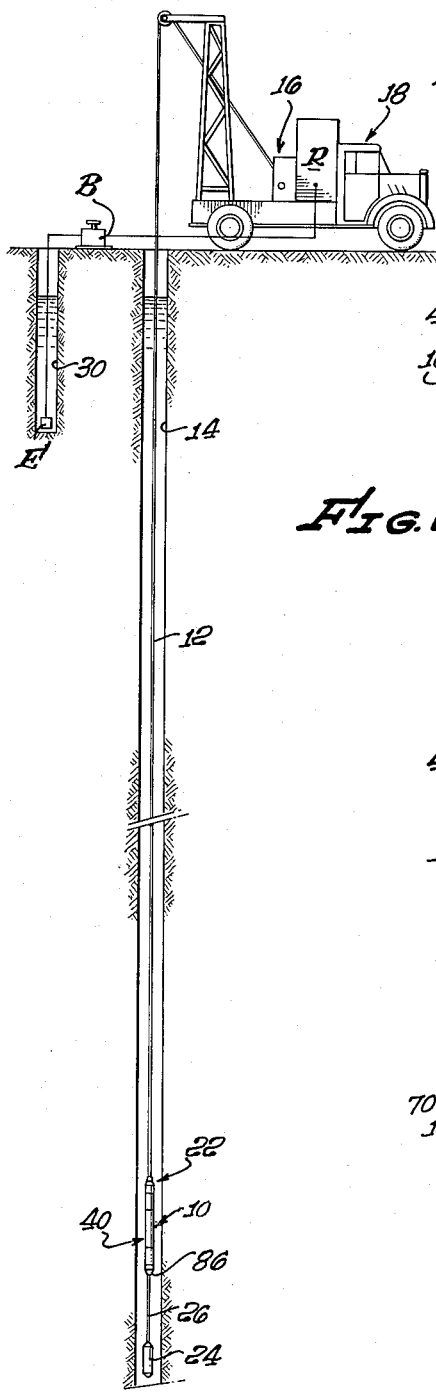
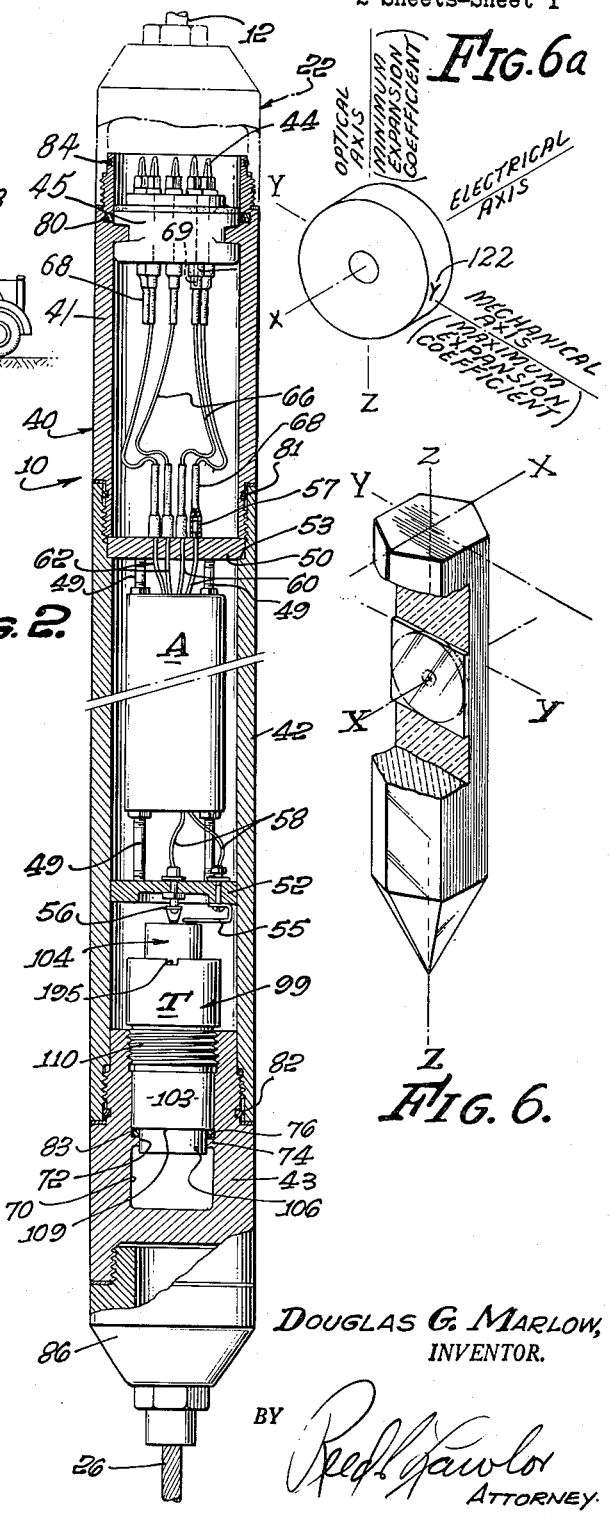
Douglas G. Marlow,
INVENTOR.
BY
Reed L. Lawlor
ATTORNEY.

June 13, 1961 D. G. MARLOW 2,988,728
PIEZOELECTRIC HYDROPHONE
Filed July 6, 1953 2 Sheets-Sheet 2

DOUGLAS G. MARLOW,
INVENTOR.

BY
ATTORNEY.

United States Patent Office 2,988,728
Patented June 13, 1961

2,988,728
PIEZOELECTRIC HYDROPHONE
Douglas G. Marlow, Arcadia, Calif., assignor, by mesne assignments, to United Geophysical Corporation, Pasadena, Calif., a corporation of California
Filed July 6, 1953, Ser. No. 366,093
19 Claims. (Cl. 340—10)

This invention relates to improvements in electromechanical transducers and more particularly to an improved hydrophone for use in determining the velocities of seismic waves through underground formations by well-shooting methods.

In the methods of seismic surveying generally employed, seismic waves are generated at various seismic wave generating stations adjacent the surface of the earth. The waves travel downwardly and, upon encountering various subterranean strata or other discontinuities, they are partially reflected, refracted, and diffracted back to the surface. The waves returned to the surface from such discontinuities are detected at various seismic wave receiver stations and records are made of the returned waves. The depth and the strike and dip of the strata that have reflected the waves and the location of other discontinuities, may be determined from the times required for the waves to travel from the various seismic wave generating stations to the discontinuities and thence to the seismic wave receiver stations and from the velocities with which the waves travel. The resultant survey of the subterranean formations determined from the records of the waves is employed to determine where petroleum is most likely to be found in the area surveyed.

It is well known that the velocity with which seismic waves travel in the earth varies from one formation to another, increasing more or less with increase in depth. For this reason, to aid in making seismic wave surveys, various methods have been devised for determining the average seismic wave velocity from a point adjacent the surface of the earth to other points at various depths.

In one method that has been employed heretofore for determining the seismic wave velocity as a function of depth, a seismometer has been suspended at various depths in a well and while the seismometer has been suspended at each depth, seismic waves have been generated at a point adjacent the surface of the earth. By measuring the time required for seismic waves to travel from the shotpoint to the seismometer while located at the various depths, the average velocity of the seismic waves over the paths in question can be computed therefrom by well-known methods by taking into account the depth of the seismometer, the depth of the shotpoint and the spacing of the shotpoint laterally from the well.

In the prior patent application Serial No. 313,020, filed by Raymond A. Peterson on October 3, 1952, for a Well-Shooting System, assigned to the same assignee and now abandoned, there is disclosed and claimed a system for making such a well velocity survey in which a pressure-responsive transducer is employed as a seismometer. The subject matter of patent application Serial No. 313,020 was transferred to patent application Serial No. 625,190 which issued as Patent No. 2,947,377 on August 2, 1960. As pointed out in that patent, an important advantage of employing a pressure-responsive transducer instead of an ordinary seismometer is that such a transducer responds to changes in pressure in the well fluid but is relatively insensitive to vibrations. For this reason, such a pressure-responsive transducer may be employed for detecting seismic waves that travel through the formations, thereby affecting the pressure of fluid in the well without substantial interference from vibrations that travel to the transducer along the cable which supports the transducer in the well.

The present invention relates to improvements in the hydrophone itself and in electromechanical transducers that may be employed in such a hydrophone.

When a hydrophone is lowered in a well, it is subjected to high pressure due to the hydrostatic head produced by the fluid in the well. The magnitude of such pressures can be readily appreciated if it is recalled that if the well is only filled with water and is not heavily laden with mud, the pressure to which the hydrophone is subjected increases about one-half pound per square inch for each increase in depth of one foot. Thus, at a depth of twenty thousand feet below the surface, a hydrophone may be subjected to a pressure of as much as about ten thousand pounds per square inch or more.

As a hydrophone is lowered in a well, it is not only subjected to high pressure, but also to high temperatures. Such increase in formation temperature with depth is almost universally observed, though the temperature gradient varies widely from one area to another. On the average for various areas, the temperature gradient is approximately 16° F. per thousand feet increase in depth. Thus, for example, the temperature in a well at a depth of twenty thousand feet is often about 400° F. or more.

One of the objects of this invention is to provide an improved hydrophone capable of withstanding the high temperatures and high pressures existing in a deep well.

Another object of the invention is to provide an electromechanical transducer employing a stack of piezoelectric crystals arranged to have high sensitivity and free of danger of fracturing when subjected to high temperatures, and which is of rugged construction, low manufacturing cost, and which is reliable in operation.

Another object of the invention is to provide an electromechanical transducer employing a stack of piezo-electric crystals which are so oriented as to prevent fracturing when subjected to high operating temperatures.

Another object of the invention is to provide an improved hydrophone comprising a piezo-electric detector unit and a preamplifier which are readily assembled and disassembled.

Another object of the invention is to provide an improved arrangement for connecting a preamplifier to a piezo-electric detector.

Still another object of the invention is to provide a multiple-element piezo-electric detector unit with an improved arrangement of electrical connections.

And still another object of the invention is to provide an improved method of manufacturing a multiple-element piezo-electric transducer.

The invention possesses numerous other objects and advantages, some of which, together with the foregoing, will be set forth in the following description of a hydrophone embodying this invention. It is to be understood that the invention is not limited to the specific form thereof that is disclosed herein, but that it may be embodied in many other forms, all of which come within the scope of the appended claims.

Referring to the drawings in which like numerals in the various figures represent identical parts:

FIG. 1 represents a vertical cross-sectional view of a portion of the earth in which a well-velocity survey is being made;

FIG. 2 is a longitudinal section of a hydrophone embodying this invention;

FIG. 6 is a diagram employed in describing an X-cut quartz element employed in the transducer; and FIG. 6a is an isometric view of an X-cut piezo-electric quartz ring showing the axes of maximum and minimum temperature coefficients of expansion.

Figure 3:
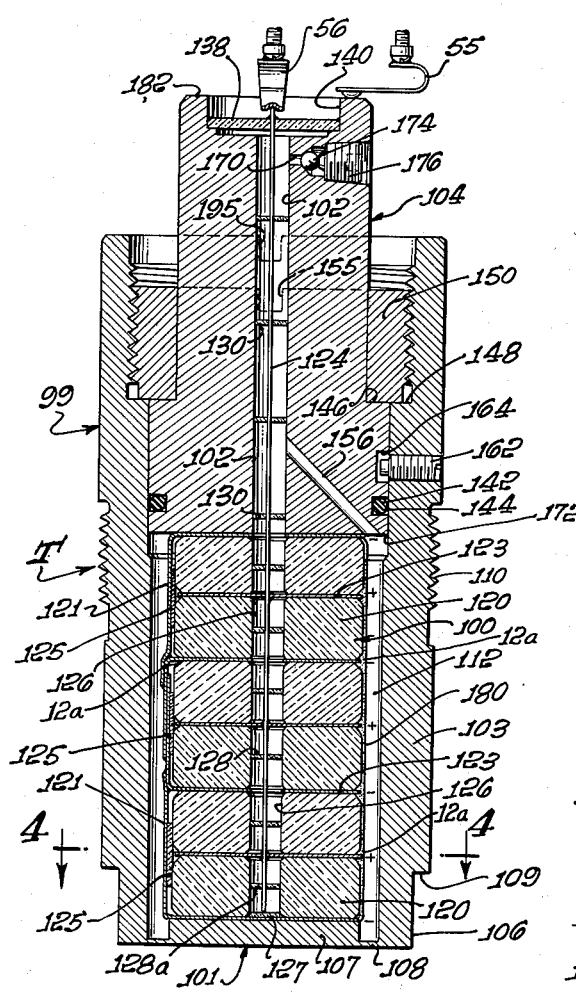
FIG. 3 is a detailed cross-sectional view of the electromechanical transducer.

Referring to the drawings and particularly to FIG. 1, there is illustrated a section of the earth in which an improved hydrophone 10 is employed for making a well-velocity survey. As shown there, the hydrophone 10 is supported at the lowermost end of a multiple-conductor cable 12 which may be raised or lowered in a well 14 by means of a hoist 16 carried by a motor truck 18. More particularly, the hydrophone 10 is attached to a connector 22 at the lowermost end of the cable 12 and a weight or sinker 24 is hung from the bottom of the hydrophone 10 by means of a multiple-strand supporting cable 26. As explained in more detail hereinafter, electrical conductors of the cable 12 are employed to supply power to the hydrophone 10 from a power supply in the truck 18 and to carry signals from the hydrophone 10 to a recorder R on the truck.

In practice, the well 14 employed for making the well-velocity survey is generally full of liquid, such as a mud, to a level near the surface of the earth. The well may extend to a depth of as much as twenty-five thousand feet below the surface. To make a well-velocity survey, use is also made of a shothole 30 that is drilled to a relatively shallow depth of about several hundred feet or less.

As explained in copending patent application, Serial No. 313,020, to make a well-velocity survey, seismic waves or impulses are generated by detonating a charge of explosive E at a point in the shothole 30 and the recorder R on the truck is employed to make a record of the seismic waves as they arrive at the hydrophone 10 in the well 14 after travel through the earth. The process of generating waves at the shothole 30 and of recording waves is repeated with the hydrophone located at each of a series of depths in the well. In practice, the cable 12 is raised or lowered in the well 14 and the successive seismic waves or impulses are generated while the hydrophone is stationary at different known depths in the well.

In making any particular record, a blaster B is operated to detonate the charge of explosive E. At the same time, a signal from the blaster B is transmitted to the recorder R and a record is made of the instant of detonation of the charge of explosive E. Subsequently, after the waves have travelled through the formations of the earth to the hydrophone 10, a record of the waves arriving at the hydrophone is made by the recorder, the record generally being in the form of an oscillograph trace. During the time interval between the detonation of the charge E and the recording of the waves, timer marks are made at regular known intervals on the record to aid in measuring the travel time.

By measuring the time required for the waves to travel from the shothole 30 to the depth of the hydrophone on each record, the average velocity of the waves over the travel path is readily determined by well-known methods. By making such determinations for different locations of the hydrophones in the well 14, a graph or table may be produced which relates average seismic wave velocity with depth. Such graphs or tables are helpful in determining the structure of subsurface formation in seismic prospecting methods.

As shown in FIG. 2, the hydrophone 10 includes a main elongate housing 40 in which is mounted a pressure-sensitive electromechanical transducer T and a preamplifier A. The transducer T is so arranged that changes in pressure of well fluid caused by the arrival of seismic waves in the neighboring formation produce corresponding changes in the voltage at the output. These changes in voltage are transmitted through the preamplifier A and thence through the cable 12 to the recording galvanometer (not shown) carried by the truck 18.

The housing 40 comprises an upper tubular member 41, a lower tubular member 42, and a gauge-holding member 43 all threadedly secured together in the order named.

The upper tubular member 41 is provided with a coupling member in the form of a multiple-prong electrical connector 45 that is adapted to be connected electrically with the standard female connector 22 at the lowermost end of the cable 12. The various prongs or contacts 44 of the connector 45 are arranged to provide connections between the preamplifier A and the conductors in the cable 12 which lead to the apparatus on the truck 18.

The preamplifier A is supported rigidly by screws 49 between two circular centering plates 50 and 52 that are located at opposite ends thereof. The upper centering plate 50 has an outer diameter intermediate between that of the internal diameter and external diameter of the tubular member 42 and is adapted to be secured in place against a shoulder 53 at the upper end of the lower tubular member 42 by means of the upper tubular member 41.

A pair of U-shaped resilient contact members 55 and 56 project downwardly from the lower side of the lower centering plate 52. The free end of one of the contacts 55 terminates at a point spaced a short distance from the axis of the hydrophone 10. The free end of the other contact member 56, however, terminates on the axis. The two contact members 55 and 56 are employed for making electrical connection with the transducer T as more fully explained hereinbelow. A pair of electrical conductors 58 provide electrical communication between the contact members 55 and 56 and the input of the preamplifier.

A plurality of contacts 57 extend upwardly from the upper plate 50. A pair of electrical conductors 60 is employed to connect the output of the preamplifier A to one pair of the upper contacts 57. Still another pair of conductors 62 is employed to connect various elements of the preamplifier A to another pair of the upper contacts 57.

Various flexible conductors 66 are employed for connecting the contacts 57 to the contacts 44 of the connector 45. The connections are affected by employing detachable connectors 68 at both ends of each conductor 66 for engaging insulated terminals 69 on the lower end of the connector 45 and the upper end of the upper centering plate 50. The lengths of the conductors 66 themselves are greater than the distance between the connector 45 and the centering plate 50 so that the upper tubular member 41 may be readily removed and replaced. Thus the contacts 44, conductors 66, and contacts 57 are employed to connect various conductors of the cable 12 with the preamplifier A.

The transducer holding member 43 is provided with a transverse passage 70 which is closed at the lower end but which communicates at its upper end through a reduced opening 72 with the interior of the tubular members 41 and 42. The opening 72 is formed by an internal flange 74 provided with an upper shoulder 76.

O-rings 80, 81, 82, 83 and 84 are employed to seal the interior of the housing against leakage of fluid from the well when the hydrophone 10 is lowered to a great depth where it is subjected to high pressure. An O-ring 84 is also employed to seal the prongs 44 against leakage of well fluid.

A coupling member 86 threadedly secured to the lower end of the holder 43 supports a cable 26 to which the sinker 24 is attached.

As shown in FIG. 3, the pressure-sensitive transducer T comprises a piezo-electric detector unit 100 in contact with a pressure-responsive diaphragm 101. The piezo-electric detector unit 100 is sealed within a metal housing 99 formed by a cup-shaped member 103 and a closure member in the form of a plug 104. The cup-shaped member is provided at its lower end with a reduced nose 106. The diaphragm 101 is formed at the lower end of the nose and comprises a plate 107 resiliently supported by a reduced annular ring 108. A shoulder 109 at the upper end of the reduced nose 106 cooperates with the internal flange 72 of the holder 43 and the O-ring 83 to seal the transducer within the hydrophone. An external thread 110 in the mid-portion of the cup-shaped member 103 is employed for threadedly securing the transducer T in place with the nose 106 projecting through the opening 72 into the transverse passage 70 with the diaphragm 101 exposed to fluid in the well 14.

The piezo-electric detector unit 100 comprises a stack of ring-shaped piezo-electric elements 120 mounted coaxially within the cup-shaped member 103 and spaced radially from the internal wall thereof by an annular space 112. In the particular embodiment of the invention illustrated here, the piezo-electric elements are in the form of rings ground from X-cut quartz plates or disks. Such crystals are employed because they possess a high efficiency for converting mechanical pressures applied along the "X" axis into electromotive forces across the faces of the crystal which are perpendicular to the "X" axis.

As shown in FIG. 6, quartz crystal is characterized by three axes, an electric axis X, a mechanical axis Y, and an optical axis Z. An X-cut crystal is one which has been so cut that its main faces are perpendicular to the electric axis X, thereby causing the mechanical axis Y and the optical axis Z to lie in planes parallel to those faces. A part of the crystal has been shown as broken away and cut in order to show clearly the orientation of one of the disks or rings 120 relative to a natural crystal and its axes.

Figure 5:
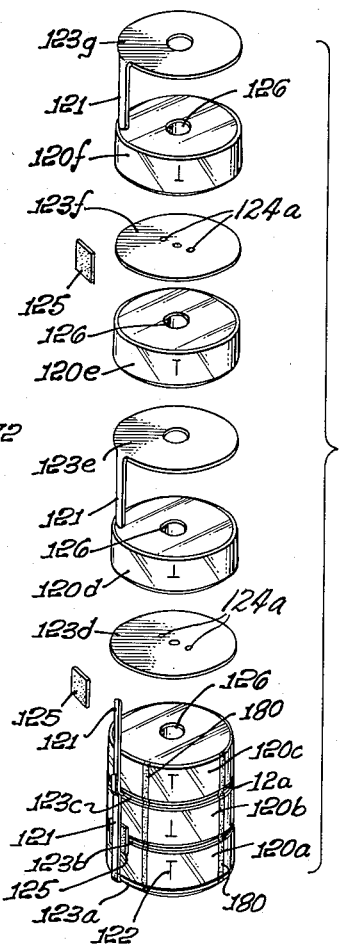
FIG. 5 is a partially exploded, partially assembled view of a stack of piezo-electric crystals.
Figure 4:
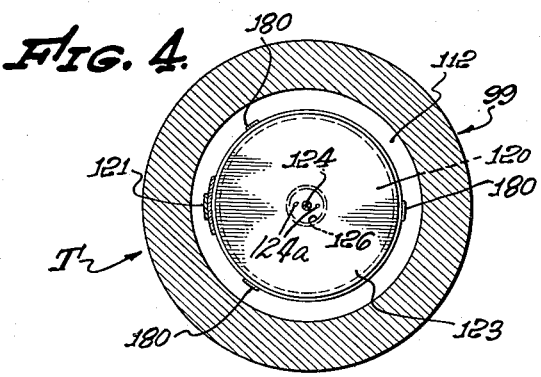
FIG. 4 is a transverse cross-sectional view on the plane 4—4 of FIG. 3.

In the manufacture of the rings, central holes 126 are formed therein and the edges are bevelled as shown in FIGS. 3 and 5, all for reasons which will become apparent hereinafter.

It will be noted that the geometrical axis of each of the rings 120 is parallel to the electric axis X and that the mechanical and optical axes Y and Z of the ring are parallel to diameters in the ring which are perpendicular to each other. It is well known that the temperature coefficient of expansion of a quartz crystal along the optical or "Z" axis is $7.97 \times 10^{-6}/°$ C. and that the temperature coefficient in all directions perpendicular thereto is $13.37 \times 10^{-6}/°$ C. The location of the minimum and maximum temperature coefficients of expansion of such a crystal in a plane perpendicular to the electrical axis X are along the optical axis Z and mechanical axis Y, respectively, as indicated in FIG. 6a.

It will be recalled that when a pressure is applied in a particular direction across the faces of an X-cut crystal, a positive charge is developed on one face of the crystal and a negative charge on the other face. Accordingly, it is necessary to distinguish between the two faces in order to be able to assemble the quartz rings in a systematic manner. The mounting arrangement of the rings 120 is facilitated by placing index marks 122 at the ends of either the mechanical axis Y or the optical axis Z of all the rings as indicated, by way of example, in FIG. 5. The cross-mark at the end of the mark 122 on the sides of each crystal ring 120 indicates the polarity of the ring.

According to this invention, all of the quartz rings 120 are mounted in the transducer T with their mechanical axes Y parallel to each other and with their optical axes Z parallel to each other, and the quartz rings 120 are stacked with successive rings oppositely polarized. Thus, in the arrangement shown, the negative faces of all the quartz rings are connected to the metal housing 99 and the positive faces are connected electrically to the central electrode 124. Metal disks 123 are mounted between adjacent rings.

A central electrode 124 in the form of a staff or rod extends coaxially through the quartz rings 120 and through a central bore 102 in the plug 104. The central bore 102 and the holes 126 in the quartz rings are of the same diameter. The lower end of the central electrode 124 abuts an insulating disk 127 plugged into the end of the lowermost quartz ring 120. Insulating spacers in the form of mica rings 128 support the central electrode 124 coaxially within the quartz rings 120. Such mica disks may be mounted within each of the quartz rings for this purpose, though it is satisfactory if a fewer number of mica rings are employed. The insulating spacers may be held in place by a tight fit on the electrode 124 or may be cemented in place.

The central electrode 124 is soldered to the alternate conducting disks 123 which lie between the quartz rings 120 of successive pairs of rings. It will be noted that the metallic disks at the ends of the successive pairs, except at the very bottom of the stack, are provided with central openings having about the same diameter as the holes passing through the rings in order to avoid any possibility of electrical contact between the central electrode 124 and those electrode disks.

A series of mica rings 130 are also employed to maintain the central electrode 124 mounted coaxially within the bore 102 of the plug 104. An enlarged mica disk 138 is mounted in a counterbore 140 at the upper end of the plug 104. The central electrode 124 extends through this mica disk 138 and is cemented thereto, and the periphery of the mica disk 138 is cemented to the wall of the counterbore 140.

The remaining metal disks are also connected together and to the housing 99 electrically, thus forming, in effect, a grounded electrode.

By virtue of the arrangement of the quartz rings 120 and the electrical connections between alternate metal disks 123, in effect, the quartz rings are all connected electrically in parallel.

It will be noted that the upper end of the central conductor 124 is pressed into a recess or dimple formed at the center of the inner contact member 56 and that an annular ring 182 at the upper edge of the plug 104 contacts a downwardly extending protrusion at the lower end of the outer contact 55. With this arrangement, good electrical connection between the transducer T and the input of the preamplifier A is assured regardless of how the preamplifier A is positioned about the axis of the hydrophone.

The plug 104 is provided with a groove 142 adjacent its lower end in which an O-ring 144 is arranged in order to provide an effective fluid-tight seal between the plug and the interior of the cup-shaped member 103.

The plug 104 is provided with a shoulder 146 intermediate its ends and the cup-shaped member 103 is provided with a corresponding internal shoulder 148 adjacent its upper end. With this arrangement, the plug 104 is forced into a predetermined position within the cup-shaped member 103 by means of a clamping screw 150 that threadedly engages the cup-shaped member 103 internally at the upper end thereof. Spanner notches 155 and 195 are employed in tightening and loosening the clamping screw 150.

The quartz rings 120 are machined to predetermined dimensions and the metallic disks that contact their faces are also of a substantially predetermined uniform thickness. Thus, by designing the cup member and the closure member 102 with the shoulders 146 and 148 at calculated positions therein, it is possible to predetermine the pressure applied across the quartz rings 120 when assembled in place with the shoulders 146 and 148 in a common plane. A screw 162 projecting inwardly into a recess 164 in the outer surface of the plug 104 prevents the plug from rotating while the clamping ring 150 is being tightened or loosened.

In practice, the shoulders 146 and 148 are so positioned on the plug 104 and the cup member 103 that the force applied to the stack of quartz rings is about equal to half the force that would be required to strain the flexible ring 108 beyond its elastic limit. Thus, with this arrangement, the transducer T is adapted to respond both to an increase in pressure and to a decrease in pressure applied to the plate 107 without any possibility that the stack of quartz rings 120 may become separated. Another advantage of this arrangement is that there is little danger that the flexible ring may become strained beyond its elastic limit by the hydrostatic head applied by fluid in a deep well.

A radial valve port 170 is drilled into the plug 104 at the upper end thereof to facilitate the evacuation of humid air from the interior of the transducer T and for replacing such humid air with dry air or dry nitrogen. By filling the transducer with dry gas, maximum insulation resistance between the central conductor 124 and the transducer housing is obtained. To facilitate filling the transducer T with dry gas, the various mica disks 128 and the metal disks that are soldered to the central electrode 124 are perforated by holes 124a to permit a free flow of gas therethrough. Also, an inclined passage 156 is drilled in the plug to provide communication between the central bore 102 therein and the annular space 112 that encircles the stack of quartz rings 120. A valve ball 174 is seated at the outer end of the valve bore and is held in place there by means of a locking screw 176 in order to prevent leakage of moisture into the transducer.

In the following description of the detector unit 100, suffixes a, b, c, etc, are employed to distinguish between identical elements that have different positions in the unit.

The detector unit 100 is assembled in a vertical position with the axes of the quartz rings 120 and the metal disks 123 vertical. In the assembly of the stack of quartz rings, the lowermost ring 120a is placed upon the lowermost metal disk 123a with the insulating disk 127 at the bottom of the opening therein. The first metallic disk 123a has no central hole. A first mica disk 128a is threaded onto the central electrode 124 and the electrode 124 and this mica disk are placed in their proper positions relative to the first metal disk. Then a second metal disk 123b having a small central hole therein is threaded over the conductor 124 and brought into position in contact with the upper surface of the first quartz ring 120a. While held in such position, it is soldered to the conductor 124 at the center thereof. A second quartz ring 120b is then placed upon the upper surface of the second metal disk 123b. A second mica disk 123b is then threaded onto the conductor 124 and forced into the second quartz ring to a position adjacent its central plane. Then a third metal disk 123c having a large central hole therein is threaded onto the conductor 124 and is placed upon the upper surface of the second quartz ring 120b. A third quartz ring 120c is then threaded onto the conductor 124 and placed on top of the third metallic electrode. A fourth metal disk 123d having a small hole therein is threaded onto the conductor 124 and then soldered in place as in the manner previously described. The process is continued with a fourth quartz ring 120d, a fifth metal disk 123e, a fifth quartz ring 120e, a sixth metal disk 123f, a sixth quartz ring 120f, and a seventh metal disk 123g until the required number of quartz rings and metal disks have been assembled. In order to avoid the need for insulation at the ends of the stack, an even number of quartz rings is employed.

Alternate metal disks 123a, 123c, 123e, and 123g commencing from the first are provided with tabs 121 as shown in FIG. 5. The tabs, which have been previously aligned with each other during the assembly operation, are folded along a common line at the edge of the stack of quartz rings. The tabs are then soldered together to form a continuous electrode at the outer edge of the stack of quartz rings. The remaining metal disks 123b, 123d, and 123f have no such tabs and, except for the contact they make with the quartz disks, they are electrically connected only to the common central conductor 124. Mica plates 125 are positioned between the tabs and the adjacent crystals in order to prevent accidental shorting of the tabs to the sidewalls of the quartz rings and the edges of the remaining metal disks 123b, 123d, and 123f.

In the assembly of the stack of quartz rings, care is exercised to mount the successive crystals with faces of identical polarity adjacent each other; that is, with their electrical axes oppositely polarized. At the same time, the index marks 122 are aligned. With the quartz rings so stacked, their mechanical axes are parallel to each other and their optical axes are also parallel to each other, and the quartz rings are electrically connected in parallel.

After the quartz rings have been assembled in the manner described above, axial pressure is applied to the stack, and while they are so maintained under pressure in the relative positions described, a thermosetting, nonconductive, phenolic cement is painted in vertical stripes 180 along the periphery of the stack of crystals. While the entire external surfaces of the stack might be coated with such cement, the coating is generally made in the form of narrow stripes 180 in order to minimize any shunting resistance that might be introduced by the cement. These stripes, it will be noted, contact the end metal disks 123a and 123g in the grooves between these disks and the adjacent quartz rings. They also overlap the edges of metal disks 123b ... 123f in the intervening grooves. In this way the cement holds the entire stack of quartz rings and metal disks together as a single unit.

The cement is then cured by baking at a suitable elevated temperature. By applying an axial force to the assembly, both during the painting of the cement onto the stack and during the baking process, leakage of any cement onto the parallel faces of the quartz rings is prevented. The cementing of the quartz rings and the metal disks together is aided by the presence of the grooves 12a formed by the bevels at the edge of the crystals.

The metal disks themselves are formed of a suitable metal having a low value of hardness and a high degree of malleability or ductility. A suitable material employed for this purpose is commercially-pure aluminum in thin sheets. Aluminum sheet that has been employed for this purpose has a thickness of about 0.0007 inch. The aluminum has a Brinnel hardness number of 23 when measured with a 500 kg. load and a 10 mm. ball and a high ductility as indicated by a 48.8% elongation in a tensile strength test of an elongated member of the aluminum. One advantage of employing a metal disk of high malleability is that the application of pressure to the stack of crystals causes the metal sheets therebetween to be squeezed into shape conforming with the shape of the surfaces of the quartz rings, thus assuring good uniform electrical contact with all parts of the faces of the quartz rings even if they are slightly rough. Another advantage is that such a disk yields under stress. The latter function is important to prevent the formation of dangerous stresses between adjacent quartz rings or between end quartz rings and either the plate 107 or the plug 104.

After the stack of crystals has been so assembled and cemented together, the plug 104 is placed on the upper end thereof and a series of mica rings is threaded onto the conductor 124 one at a time and gradually forced to suitable positions for maintaining the electrode 124 in a central position within the plug 104.

The plug 104 and the stack of quartz rings are then placed within the cup-shaped member 103 and after insertion of the screw 162 in its recess 164, they are compressed in place by screwing the clamping ring 150 into engagement with the shoulders 146 and 148 of the plug 104 and the cup-shaped member 103. The cover disk 138 is then positioned on the upper end of the electrode 124 and sealed in place. Then the screw 176 and the valve ball 174 are removed and a vacuum pump connected to the valve port 170. While the vacuum pump is operating, the transducer is subjected to an elevated temperature of at least 212° F. After the transducer has been dried by heating in this way for an extended period of an hour or more, dry nitrogen is fed into the interior thereof. This process is then repeated several times, dry nitrogen being admitted each time and the valve ball and lock screw are finally replaced, thereby sealing dry nitrogen within the transducer.

With the arrangement of crystals described above, it will be noted that when the assembly of quartz rings is baked or when the completed detector unit 100 is otherwise heated, all the rings are subjected to uniform expansion forces in any one direction perpendicular to the axis of the stack. Except for the fact that some differential expansion is likely to occur between the end rings 120a and 120f and the plate 107 or the plug 104, all the rings would expand uniformly in any such direction. However, even when such differential expansion occurs at the ends of the stack, the presence of the malleable metal disks 123a and 123g between the end quartz rings and the adjacent metal parts flow slightly, thus minimizing the stresses that might otherwise occur because of such differential expansion. Accordingly, the appearance of shearing stresses across the quartz rings is avoided to a very large extent. The employment of the metal disks 123a and 123g at the ends of the detector unit 100 also facilitates the making of electrical connections between the detector housing 99 and certain faces of the quartz rings.

The cup-shaped member 103 and the plug 104 are made of beryllium copper in order that the resilient ring 108 shall have sufficient compliance and also sufficient strength to operate satisfactorily at great depths. It is to be noted that the temperature coefficient of expansion of beryllium copper is $17 \times 10^{-6}/°C$.

Though the invention has been described only with reference to its application to X-cut quartz crystal elements, it is clear that it may be applied equally well to other piezo-electric elements which are characterized by temperature coefficients of expansion in a direction parallel to the faces of the crystal elements which have maximum and minimum values along perpendicular axes that are parallel to those faces. Thus, for example, it may be applied to a stack of quartz crystals which are cut in any plane parallel to the optical axis or to a stack of quartz crystals cut in a plane parallel to the "Y" axis and oblique to the optical axis.

For this reason, where reference is made in the claims to maximum and minimum temperature coefficients of expansion in a particular plane, it will be understood that temperature coefficients of expansion in some directions transverse to the plane may be larger than such maximum or lower than such minimum. In other words, such maximum and minimum coefficients refer to the coefficients of expansion of the components of strain or elongation in the plane in question.

One reason for employing X-cut quartz crystals rather than other cuts is that they are more sensitive than other cuts. Another reason is that X-cut quartz crystals are more readily formed with circular cross-sections. In the case of X-cut quartz crystals, the axes of maximum and minimum temperature coefficients of expansion of the crystal as a whole are parallel to the faces of the crystal.

Where the terms "parallel" and "perpendicular" are employed in this specification, it will be understood that they are not used in their strict mathematical sense, but that they refer to arrangements which are substantially parallel or perpendicular.

All the copending applications referred hereto herein are owned by assignee of the present application.

Although only one particular embodiment of the invention has been specifically illustrated and described herein, it will be obvious that the invention is not limited thereto, but is capable of a variety of mechanical embodiments. Various changes which will now suggest themselves to those skilled in the art may be made in the material form, details of construction and arrangement of the elements without departing from the principles of the invention.

Accordingly, it is to be understood that the invention includes all forms thereof which come within the scope of the appended claims.

What is claimed is:

1. In an electromechanical transducer,
a stack of similar piezo-electric elements normally compressed between a pair of relatively movable members thereof,
successive elements in the stack being oppositely polarized, whereby adjacent surfaces generate like charges when the stack is subjected to changes in pressure,
each of said elements having temperature coefficients of expansion in a plane transverse to the axis of said stack which have maximum and minimum values along perpendicular axes, said axes of maximum coefficient being parallel to each other and said axes of minimum coefficient also being parallel to each other,
layers of conducting material compressed between adjacent faces of successive elements,
and a pair of conductors connected respectively to alternate intervening conducting layers.

2. In an electromechanical transducer,
a stack of X-cut quartz piezo-electric elements normally compressed between a pair of relatively movable members thereof,
successive elements in the stack being oppositely polarized, whereby adjacent surfaces generate like charges when the stack is subjected to changes in pressure,
the optic axes of the elements being parallel to each other and the mechanical axes of the elements also being parallel to each other, said elements being compressed in a direction perpendicular to said axes,
layers of conducting material compressed between adjacent faces of successive elements,
and a pair of conductors connected respectively to alternate intervening conducting layers.

3. In an electromechanical transducer,
a coaxial stack of similar ring-shaped piezo-electric elements,
successive elements in the stack being oppositely polarized, whereby adjacent surfaces generate like charges when the stack is subjected to changes in pressure,
layers of conducting material disposed between adjacent faces of successive elements,
external conducting means connected to one set of alternate conducting layers,
and a central conductor extending through the central holes in said ring-shaped piezo-electric elements, said conductor being connected to the other set of alternate conducting layers.

4. In an electromechanical transducer,
a coaxial stack of similar ring-shaped piezo-electric elements,
successive elements in the stack being oppositely polarized, whereby adjacent surfaces generate like charges when the stack is subjected to changes in pressure,
layers of conducting material disposed between adjacent faces of successive elements,
external conducting means connected to one set of alternate conducting layers,
a central conductor extending through the central holes in said ring-shaped piezo-electric elements, said conductor being connected to the other set of alternate conducting layers,
and insulating spacers supporting said central conductor coaxially in said stack.

5. In an electromechanical transducer,
a stack of piezo-electric elements having beveled external edges forming peripheral grooves between adjacent elements,
successive elements in the stack being oppositely polarized, whereby adjacent surfaces generate like charges when the stack is subjected to changes in pressure,
layers of conducting material disposed between adjacent faces of successive elements and projecting into said grooves, a pair of conductors connected respectively to alternate conducting layers, and an external coating of thermosetting plastic said cured external coating extending along the length of said stack and at least partially filling grooves between adjacent elements, said external coating securing said stack and said layers together as a unit.

6. In an electromechanical transducer:

a cylindrical member having a cylindrical side wall and an end wall at one end thereof, said end wall being resiliently supported at one end of said side wall;

a stack of piezo-electric disks mounted coaxially within said cylindrical member, alternate disks being oppositely polarized, whereby adjacent surfaces generate like charges when the stack is subjected to changes in pressure;

layers of conducting material disposed between adjacent disks;

and a rigid plug member closing the other end of said cylindrical member and compressing said stack of discs solidly against said end wall, said stack of discs and said layers being spaced from said side wall of said cylindrical member, whereby said discs are responsive to relative movement of said end wall and said plug member and are not responsive to lateral movement of said cylindrical wall.

7. In an electromechanical transducer:

a cylindrical member having a cylindrical side wall and an end wall at one end thereof, said end wall being resiliently supported at one end of said side wall;

a stack of piezo-electric disks mounted coaxially within said cylindrical member, alternate disks being oppositely polarized, whereby adjacent surfaces generate like charges when the stack is subjected to changes in pressure;

layers of conducting material disposed between adjacent disks;

a rigid plug member closing the other end of said cylindrical member, said plug member and said cylindrical member having corresponding shoulders;

and a clamping screw threadably engaging said cylindrical member, said clamping screw having bearing areas for engaging said shoulders to bring them into predetermined spacial relation, said clamping screw and said plug member compressing said stack of discs and layers solidly against said end wall when said shoulders are so engaged, said stack of discs and layers being spaced from the side wall of said cylindrical member whereby said discs are responsive to relative movement of said end wall and said plug member and are not responsive to lateral movement of said cylindrical wall.

8. In an electromechanical transducer as defined in claim 7: means on said cylindrical member for limiting the degree of rotation of said plug member as said clamping screw is rotated.

9. An electromechanical transducer comprising:

a cylindrical member having a cylindrical side wall and an end wall at one end thereof, said end wall being resiliently supported at one end of said side wall;

a stack of ring-shaped piezo-electric elements mounted coaxially within said cylindrical member;

conducting disks disposed between successive piezo-electric elements;

a plug member closing the other end of said cylindrical member, said plug member being provided with a central bore coaxial with the openings in said piezo-electric elements;

an external conducting means connected to one set of alternate conducting disks;

a central conductor extending through the bore of said plug member and the openings in said piezo-electric elements, said conductor being connected to the other set of alternate conducting disks;

and means for compressing said stack of elements and said disks between said plug member and said end wall.

10. An electromechanical transducer as defined in claim 9 including insulating element supporting said central conductor within said piezo-electric elements and within said plug.

11. An electromechanical transducer as defined in claim 9 comprising a closure disk sealed in the outer end of said central bore, said central conductor passing through said closure disk and being sealed thereto, said piezo-electric elements being spaced from the side wall of said cylindrical member, passage means providing communication between said bore and the annular space between said cylindrical member and said piezo-electric elements, and valve means communicating with said bore for filling the space in said transducer with dry gas.

12. An electromechanical transducer as defined in claim 9 comprising perforated insulating disks supporting said central conductor within said elements and within said plug, a closure disk sealed in the outer end of said central bore, said central conductor passing through said closure disk and being sealed thereto, said piezo-electric elements being spaced from the side wall of said cylindrical member, passage means providing communication between said bore and the annular space between said cylindrical member and said piezo-electric elements, and valve means communicating with said bore for filling the space in said transducer with dry gas.

13. In a hydrophone adapted to be raised and lowered in a bore hole a tubular housing having a wall section extending transversely from one side of said tubular housing to the other for defining a lateral passage extending across said tubular housing from one side thereof to the other, said housing having an opening in said wall section that communicates with said lateral passage, a tubular member sealed in said housing with one end thereof projecting through said opening and into said passage, a plate closing said end of said tubular member and being resiliently mounted therein, a piezo-electric detector unit within said tubular member and responsive to movement of said plate relative to the remainder of said tubular member, said piezo-electric detector unit comprising a piezo-electric crystal, means for holding said detector unit within said tubular member and for compressing said crystal solidly against said plate, said crystal being spaced from the side wall of said tubular member whereby said discs are responsive to relative movement of said end wall and said plug member and are not responsive to lateral movement of said cylindrical wall, and electrical terminals connected to said detector unit.

14. In a hydrophone adapted to be raised and lowered in a bore hole, a tubular housing having a wall section extending transversely from one side of said tubular housing to the other for defining a lateral passage extending across said tubular housing from one side thereof to the other, said housing having an opening in said wall section that communicates with said lateral passage, a tubular member having a reduced outer end projecting through said opening and into said passage, said member being sealed to the wall of said housing, a plate closing the outer end of said tubular member and being resiliently mounted therein, a piezo-electric detector unit, said piezo-electric detector unit comprising a piezo-electric crystal, means for holding said detector unit within said tubular member and for compressing said crystal solidly against said plate, said crystal being spaced from the side wall of said tubular member whereby said discs are responsive to relative movement of said end wall and said plug member and are not responsive to lateral movement of said cylindrical wall, and electrical terminals connected to said detector unit.

15. In a hydrophone adapted to be raised and lowered in a bore hole, a tubular housing having a wall extending transversely from one side thereof to the other for defining a lateral passage that extends from one side of said tubular housing to the other, said tubular housing having a first coaxial opening in said wall in communication with said lateral passage and a second coaxial opening at the other end thereof, a tubular member sealed in said housing with one end thereof projecting through said first coaxial opening and into said passage, a plate closing said end of said tubular member and being resiliently mounted therein, a piezo-electric detector unit within said tubular member, said piezo-electric detector unit comprising a piezo-electric crystal, means for holding said detector unit within said tubular member and for compressing said crystal solidly against said plate, said crystal being spaced from the side wall of said tubular member whereby said discs are responsive to relative movement of said end wall and said plug member and are not responsive to lateral movement of said cylindrical wall, a pair of electrical output terminals at the other end of said tubular member, said output terminals being operatively connected to said detector unit, an amplifier unit removably located in said housing and outside said tubular member, said amplifier unit having input terminals, and means for maintaining said input terminals in contact with the respective output terminals.

16. In a hydrophone, a tubular member having a wall extending transversely for defining a lateral passage extending from one side thereof to the other said tubular member having a first coaxial opening at one end thereof and a second coaxial opening in communication with said lateral passage, a unitary cylindrical cup-shaped member having a cylindrical side wall and an end wall at one end thereof, said end wall comprising a pressure-responsive diaphragm, means for supporting said cup-shaped member in sealed relationship with said tubular member with said diaphragm exposable to fluid in said lateral passage, a stack of ring-shaped piezo-electric elements mounted coaxially within said cup-shaped member, a plug member closing the other end of said cup-shaped member, means for compressing said stack of elements between said plug member and said end wall, conducting disks disposed between successive piezo-electric elements, a pair of output terminals at said other end of said cup-shaped member, said terminals being connected to alternate conducting disks, an amplifier unit removably located in said tubular member, said amplifier unit having a pair of resilient input terminals, and means for maintaining said input terminals in contact with said output terminals.

17. In the manufacture of a multiple-element piezo-electric transducer, the steps of:

forming a plurality of similar polarized piezo-electric plates which have temperature coefficients of expansion in a plane parallel to the faces of the plates that have maximum and minimum values along two perpendicular axes, stacking the plates with plane conductors between successive piezo-electric plates, and with successive plates oppositely polarized, whereby adjacent surfaces generate like charges when the stack is subjected to changes in pressure, and with such axes of maximum temperature expansion coefficient parallel with each other and such axes of minimum temperature expansion coefficient parallel with each other, compressing the stack of plates and conductors along an axis perpendicular to the faces of the plates, and connecting electrodes to alternate conductors.

18. In the manufacture of a multiple-element piezo-electric transducer, the steps of:

forming a plurality of similar polarized piezo-electric plates which have temperature coefficients of expansion in a plane parallel to the faces of the plates that have maximum and minimum values along two perpendicular axes, stacking the plates with plane conductors between successive piezo-electric plates, and with successive plates oppositely polarized, whereby adjacent surfaces generate like charges when the stack is subjected to changes in pressure, and with the axes of maximum temperature expansion coefficient parallel with each other and the axes of minimum temperature expansion coefficient parallel with each other, compressing the stack of plates and conductors along an axis perpendicular to the faces of the plates, coating the stack externally with a thermosetting cement, and curing the cement in place by heating the stack while under compression.

19. In the manufacture of a multiple-element piezo-electric transducer, the steps of:

forming a plurality of similar quartz crystal plates having their optic axes parallel to their faces, stacking the plates with metal sheets between successive plates with successive plates oppositely polarized, whereby adjacent surfaces generate like charges when the stack is subjected to changes in pressure, and with their optic axes parallel, compressing the plates and sheets together along an axis perpendicular to the faces of the plates, coating the stack externally with a thermosetting cement, and curing the cement in place by heating the stack while under compression.

References Cited in the file of this patent

UNITED STATES PATENTS

| | | |
|---|---|---|
| 1,903,812 | Gebhard et al. | Apr. 18, 1933 |
| 2,152,589 | Haas et al. | Mar. 29, 1939 |
| 2,181,132 | Kallmeyer | Nov. 28, 1939 |
| 2,185,599 | Mason | Jan. 2, 1940 |
| 2,233,992 | Wyckoff | Mar. 4, 1941 |
| 2,245,379 | Barton | June 10, 1941 |
| 2,270,166 | Heinsch et al. | Jan. 13, 1942 |
| 2,425,594 | Brown | Aug. 12, 1947 |
| 2,473,835 | Turner | June 21, 1949 |
| 2,486,146 | Frondel | Oct. 25, 1949 |
| 2,490,236 | Shaper | Dec. 6, 1949 |
| 2,512,138 | Butt | June 20, 1950 |
| 2,520,938 | Klein | Sept. 5, 1950 |
| 2,648,056 | Jakosky | Aug. 4, 1953 |

FOREIGN PATENTS

| | | |
|---|---|---|
| 558,265 | Great Britain | June 24, 1943 |

OTHER REFERENCES

Cady: "Piezoelectricity," McGraw-Hill, 1946, page 194.

Radio Amateur's Handbook, 1946 ed. (23rd Edition, 1946), published by the American Radio Relay League, Inc., West Hartford 7, Connecticut, p. 234.

Mason, W. P.: Piezoelectric Crystals and Their Applications to Ultrasonics, 1950, published by D. Van Nostrand Co., New York, p. 103.